United States Patent [19]

Okuda et al.

[11] Patent Number: 5,738,715
[45] Date of Patent: Apr. 14, 1998

[54] EMULSION INK FOR STENCIL PRINTING

[75] Inventors: Sadanao Okuda; Yoshihiro Hayashi, both of Inashiki-gun, Japan

[73] Assignee: Riso Kagaku Corporation, Tokyo, Japan

[21] Appl. No.: 759,630

[22] Filed: Dec. 5, 1996

[30] Foreign Application Priority Data

Dec. 5, 1995 [JP] Japan ................... 7-339889

[51] Int. Cl.$^6$ ................... C09D 11/02
[52] U.S. Cl. ................... 106/31.26; 106/31.65; 106/31.9
[58] Field of Search ................... 106/20 R, 20 C, 106/30 R, 27 R, 27 A, 31.26, 31.9, 31.65, 476

[56] References Cited

U.S. PATENT DOCUMENTS

| 5,389,130 | 2/1995 | Batlaw et al. ................... 106/20 R |
| 5,395,435 | 3/1995 | Mizobuchi et al. ................... 106/27 R |
| 5,429,841 | 7/1995 | Batlaw et al. ................... 106/23 D |
| 5,573,578 | 11/1996 | Okuda ................... 106/20 R |
| 5,575,839 | 11/1996 | Okuda ................... 106/20 C |
| 5,609,670 | 3/1997 | Okuda et al. ................... 106/20 R |

FOREIGN PATENT DOCUMENTS

| 0 609 076 | 8/1994 | European Pat. Off. . |
| 0 661 356 | 7/1995 | European Pat. Off. . |
| 61-255967 | 11/1986 | Japan . |
| 64-14284 | 1/1989 | Japan . |
| 4-132777 | 5/1992 | Japan . |
| 5-117565 | 5/1993 | Japan . |
| 7-188598 | 7/1995 | Japan . |

*Primary Examiner*—Helene Klemanski
*Attorney, Agent, or Firm*—Cushman Darby & Cushman IP Group of Pillsbury Madison & Sutro, LLP

[57] ABSTRACT

A water-in-oil (W/O) emulsion ink for stencil printing, high in printing density, low in seep through and blurring and excellent in temperature stability, is provided, which contains carbon black as a water-insoluble colorant in the water phase, in which said carbon black has a pH value of 6 to 10. The carbon black is preferably 10 μm or less in average particle diameter. The water phase may contain an oil-in-water (O/W) emulsion of resin and/or a water-soluble resin to improve dispersion of carbon black in water and its fixation to prints. The oil phase may be free from any resinous component.

14 Claims, No Drawings

EMULSION INK FOR STENCIL PRINTING

The present invention relates to an emulsion ink for stencil printing, and more specifically relates to an emulsion ink which is excellent in emulsion stability, high in printing density and low in blurring and seep through.

Stencil printing is effected by perforating a stencil sheet to make a master, and passing inks through the perforated portions of the master to an article to be printed such as printing paper. Since the master is easy to make, stencil printing is utilized in a wide range of fields.

Conventional emulsion inks for stencil printing are usually water-in-oil (W/O) emulsion inks which contain pigments as colorants in the oil phase thereof, as disclosed in Japanese Patent Laid-open (Kokai) Nos. 255967/86, 14284/89, 132777/92 and 117565/93. Once this type of W/O emulsion inks are printed on an article such as printing paper to be printed, the oil phase, which is the outer phase of emulsion, first permeates the printed article, and then the water phase, which is the inner phase of emulsion, permeates into the printed article and/or evaporates therefrom. However, the W/O emulsion inks are disadvantageous in that they take much time to permeate and dry, easily cause blurring, and deeply permeate into printing paper to cause seep through, because they contain pigments in the oil phase.

In order to overcome such disadvantages as mentioned above, the present applicant suggested a W/O emulsion ink which contains a water-insoluble colorant in the water phase thereof, as disclosed in Japanese Patent Laid-open (Kokai) No. 188598/95. However, it is still not satisfactory in that the water-insoluble colorant contained in the water phase, particularly carbon black, often lowers stability of emulsion.

It is an object of the present invention to overcome the above-mentioned problem of the W/O emulsion ink of the type containing water-insoluble colorants in the water phase thereof, and provide an emulsion ink for stencil printing, which is excellent in emulsion stability, high in printing density, and low in blurring and seep through.

As a result of an intensive research for the above purpose, the present inventors have found that stability of W/O emulsion inks for stencil printing is influenced by pH value of carbon black that is added as a water-insoluble colorant to the water phase of the inks, and have completed the present invention.

That is, the present invention relates to a water-in-oil (W/O) emulsion ink for stencil printing, which contains carbon black as a water-insoluble colorant in the water phase thereof, characterized in that pH value of the carbon black is from 6 to 10.

Carbon black is generally subjected to oxidation treatment during its manufacturing process, and thus bears acid functional groups such as carboxyl, carbonyl and hydroxyl groups on the surface thereof. The pH value of carbon black varies depending upon degree of the oxidation treatment. When the pH value is within a range of weak acid to weak alkali, more concretely, 6 to 10, carbon black is presumed to have a small amount of acid groups, and thus emulsion is maintained in a stable condition, namely in a state low in change of viscosity, for a long time while carbon black is contained in the water phase. Conversely, when the pH value of carbon black is outside of the above range, particle size of the water phase of emulsion becomes larger, emulsion is often separated into water and oil or destroyed, or carbon black is often transferred from the water phase to the oil phase. Although the cause of these problems is not exactly known, it is assumed that when carbon black having acid functional groups which are high in polarity is contained in the water phase, adsorption of carbon black to interface of the emulsion occurs, thereby lowering the stability of emulsion.

Thus, it is considered that optimum stability of the emulsion ink is obtained at a pH of 6 to 10, preferably 7–9, in which carbon black contains little polar group or does not adsorb to the interface of emulsion.

In the W/O emulsion ink, the oil phase as the outer phase is higher in permeability and lower in surface tension than the water phase, and thus the former phase first permeates an printed article, and then the latter phase permeates the same and/or evaporates therefrom. In the present W/O emulsion ink, carbon black as a water-insoluble colorant is stably present in the water phase, and thus carbon black dose not readily move with permeation by capillary phenomena of the oil phase into printing paper. Since the permeation of oil phase into printing paper prior to the water phase also inhibits permeation of the water phase, carbon black tends to stay at the printed surface of the paper, thereby yielding a print high in printing density and low in seep through and blurring.

According to the present invention, colorants do not have to exist in the oil phase of W/O emulsion inks, or the oil phase does not have to contain any resin as a dispersant or fixing agent for the colorants since carbon black is held in the water phase stably and does not tend to move to the oil phase. Since resinous components can be precluded from the oil phase, temperature dependency can be eliminated from the ink, and an ink which is stabilized against temperature change can be provided.

Carbon black having a pH of 6–10 used in the present invention can readily be selected from various kinds of carbon black that have been manufactured in processes which do not employ so much oxidation treatment or which employ no oxidation treatment. Alternatively, pH of carbon black maybe adjusted to 6 to 10 by varying degree of oxidation treatment in manufacturing processes. The pH of carbon black is determined in accordance with JIS(Japanese Industrial Standards) Z 8802 in which carbon black is added to water and stirred thoroughly and then pH of the water is measured at room temperature.

Carbon black used as a water-insoluble colorant in the present invention includes furnace carbon black, lampblack, acetylene black, channel black and the like. The amount of carbon black in the present invention is preferably 1–30% by weight, more preferably 3–10% by weight, based on the total weight of the ink. The average particle size of the carbon black is desirably 10 μm or less, more desirably 3 μm or less. When the average particle size exceeds 10 μm, the W/O emulsion of the ink tends to be destructed.

Usually, the present W/O emulsion ink for stencil printing can be constituted by about 10 to 70% by weight of the oil phase and about 90 to 30% by weight of the water phase.

As apparent from the above, the water phase comprises water and carbon black, and may further comprise an oil-in-water (O/W) emulsion of resins and/or a water soluble resin in order to improve dispersion of carbon black in water, fixation of carbon black to articles to be printed such as printing paper, or the like.

Examples of the O/W emulsion of resin include emulsions of resins such as polyvinyl acetate, copolymers of ethylene and vinyl acetate, copolymers of vinyl acetate and acrylic esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and the water-soluble resin is preferably 1–20% by weight, more preferably 2–10% by weight as solid content based on the total weight of the ink. If it is less than 1% by weight, colorant components in the water phase are not sufficiently fixed to articles to be printed. If it exceeds 20% by weight, inks form a film on perforations of a stencil sheet and become difficult to pass the perforations when inks are left on the stencil sheet for a long time.

Further, the water phase may contain ionic surfactants, amphoteric surfactants, nonionic surfactants, or polymeric, silicone-containing or fluorinated surfactants, in order to improve wetting, dispersion and the like of carbon black in water. As required, the water phase may further contain other water soluble additives such as wetting agents, electrolytes, antifungal agents, antioxidants, water evaporation inhibiting agents, antifreeze agents and the like.

The oil phase can be constituted by a non-volatile solvent, a volatile solvent, an emulsifying agents, and the like. As mentioned above, no resin may be contained in the oil phase since carbon black as a colorant is present in the water phase.

As the non-volatile solvent, can be used mineral oils such as motor oils, spindle oils, machine oils and liquid paraffin, and vegetable oils such as olive oil, castor oil and salad oils. As the volatile solvent, can be used known solvents of the types of mineral oils and vegetable oils. Proportion of non-volatile solvents to volatile solvents (i.e., non-volatile solvents/volatile solvents) varies depending upon blending ratio of oil phase and water phase, but is preferably within a range of 50–95/50–5 on weight basis.

The emulsifying agent is used to form the W/O emulsion, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like. Meanwhile, since the water phase of the present emulsion ink often contains surfactants for dispersing water-insoluble colorants therein or forming an abovementioned O/W emulsion of resins, it is preferable that the emulsifying agent is appropriately selected so that the W/O emulsion of the present ink is not destructed by these surfactants that are present in the water phase.

The present W/O emulsion ink can readily be made, for example, by adding the above mentioned water phase to the above mentioned oil phase and stirring the mixture to emulsify it.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1 to 5 and Comparative Examples 1 to 3

A carbon-dispersed aqueous solution was prepared using carbon black shown in Table 1 in accordance with the formulation shown in Tables 2 or 3. Meanwhile, the dispersion was effected for 24 hours in a ball mill containing stainless steel balls of 9 mm in diameter. Particle size of carbon black after the dispersion is also shown in Table 1.

The oil phase was prepared by blending and stirring the components in accordance with the formulation shown in Table 2 or 3. Then, the carbon-dispersed solution was gradually added to the oil phase under stirring to obtain a W/O emulsion ink for stencil printing.

Also, Table 1 shows pH value of carbon black as measured in the above mentioned manner. Average particle size of carbon black was measured using a centrifugal particle size measuring apparatus CAPA-700 manufactured by Kabushiki Kaisha Horiba Seisakusho.

Performance tests

Stencil printing was effected by use of a stencil printing apparatus RISOGRAPH (registered trademark: manufactured by RISO KAGAKU CORPORATION) with inks prepared in the above Examples. Then, prints thus obtained were examined in terms of printing density, seep through, blurring and temperature stability in accordance with the following procedures (1)–(4), and the results are shown in Table 4.

(1) Printing density: Printing density on a solid region of the print was measured using a reflection density measuring apparatus RD920 manufactured by Macbeth Corp.

(2) Seep through: Printing density on the side opposite to the solid region of the print was measured by the same reflection density measuring apparatus as in (1).

(3) Blurring: Blurring around the ink of the print was observed by use of a microscope of 80 times magnification. When little blurring is observed, the result is indicated as (−) in Table 4. When blurring is conspicuous, the result is indicated as (+) in Table 4.

(4) Temperature stability: Printing density on a solid region of a print obtained at a low temperature (5° C.) was measured by the same reflection density measuring apparatus as in (1).

Also, after the ink was left for 6 months at a constant temperature of 50° C., emulsion stability was evaluated in accordance with lowering rate of viscosity calculated by the following equation:

$$\text{lowering rate of viscosity} = (V1-V2)/V1$$

wherein V1 is viscosity before the ink is left, V2 is viscosity after the ink is left, and viscosity was measured by a Brookfield viscometer. The results are also shown in Table 4.

TABLE 1 pH value and particle size of carbon black used

| | pH value | Average particle size (μm) |
|---|---|---|
| Example 1 | 7.5 | 0.15 |
| Example 2 | 8.0 | 0.18 |
| Example 3 | 8.5 | 0.32 |
| Example 4 | 7.0 | 0.12 |
| Example 5 | 6.0 | 0.25 |
| Comparative Example 1 | 3.0 | 0.32 |
| Comparative Example 2 | 4.0 | 0.25 |
| Comparative Example 3 | 2.5 | 0.22 |

TABLE 2

Formulations of W/O emulsion inks (parts by weight)

| Number of Examples | 1 | 2 | 3 | 4 | 5 |
|---|---|---|---|---|---|
| Oil phase: | | | | | |
| Non-volatile solvent: #40 Motor oil | 13.0 | ← | ← | ← | ← |
| Volatile solvent: No.5 solvent (manufactured by Nippon Oil Co. Ltd.) | 5.0 | ← | ← | ← | ← |
| Emulsifying agent: Sorbitan monooleate | 2.0 | ← | ← | ← | ← |
| Water phase: | | | | | |
| Water-insoluble colorant: furnace carbon black | 4.0 | ← | ← | ← | ← |
| Water: ion-exchanged water | 60.0 | ← | ← | ← | ← |
| Dispersing agent: polyvinyl pyrrolidone | 1.0 | ← | ← | ← | ← |
| O/W emulsion of resin: acrylic acid ester (solid content 50%) | 10.0 | ← | ← | ← | ← |
| Wetting agent: Ethylene glycol | 5.0 | ← | ← | ← | ← |

TABLE 3

Formulations of W/O emulsion inks (parts by weight)

| Number of Comparative Examples | 1 | 2 | 3 |
|---|---|---|---|
| Oil phase: | | | |
| Non-volatile solvent: #40 Motor oil | 13.0 | ← | ← |
| Volatile solvent: No.5 solvent (manufactured by Nippon Oil Co. Ltd.) | 5.0 | ← | ← |
| Emulsifying agent: Sorbitan monooleate | 2.0 | ← | ← |
| Water phase: | | | |
| Water-insoluble colorant: furnace carbon black | 4.0 | ← | ← |
| Water: ion-exchanged water | 60.0 | ← | ← |
| Dispersing agent: polyvinyl pyrrolidone | 1.0 | ← | ← |
| O/W emulsion of resin: acrylic acid ester (solid content 50%) | 10.0 | ← | ← |
| Wetting agent: Ethylene glycol | 5.0 | ← | ← |

TABLE 4

Results of Examples and Comparative Examples

|  | Ex. 1 | Ex. 2 | Ex. 3 | Ex. 4 | Ex. 5 | C.Ex.1 | C.Ex.2 | C.Ex.3 |
|---|---|---|---|---|---|---|---|---|
| Printing Density | 1.11 | 1.13 | 1.18 | 1.18 | 1.15 | 1.08 | 1.12 | 1.11 |
| Sleep through | 0.14 | 0.12 | 0.14 | 0.14 | 0.13 | 0.13 | 0.14 | 0.12 |
| Blurring | (—) | (—) | (—) | (—) | (—) | (—) | (—) | (—) |
| Temperature Stability | 1.05 | 1.07 | 1.10 | 1.08 | 1.06 | 1.00 | 1.01 | 1.01 |
| Emulsion Stability | 0.11 | 0.12 | 0.22 | 0.15 | 0.18 | 0.78 | 0.56 | 0.50 |

Note: "Ex." refers to Example, and "C.Ex." refers to Comparative Example.

From the results of Table 4, it is found that when carbon black shows a pH ranging from 6 to a weak alkali, viscosity of the emulsion ink is not lowered even when the ink is stood for a long time, and thus stable emulsion is obtained. It is also found that existence of carbon black in the water phase contributes to provide a print high in printing density, low in seep through and blurring and excellent in temperature stability.

According to the present invention, carbon black having a pH value of 6 to 10 is used in a W/O emulsion ink which contains the carbon black as a water-insoluble colorant in the water phase, and thus emulsion is stabilized and is not destructed even if the ink is left for a long time. Furthermore, since carbon black is stably present in the water phase and hardly moves to the oil phase, the ink can be dried with high density and no seep through or blurring. In addition, since colorants or resins as a dispersant or fixing agent for the colorants may be excluded from the oil phase, it becomes possible to provide inks which do not vary viscosity depending upon temperature change.

We claim:

1. A water-in-oil (W/O) emulsion ink for stencil printing, which contains carbon black as a water-insoluble colorant in the water phase and contains an oil-in-water (O/W) emulsion of resin and/or a water soluble resin in the water phase, in which said carbon black has a pH value of 6 to 10.

2. A water-in-oil (W/O) emulsion ink for stencil printing according to claim 1, wherein said carbon black has a pH value of 7 to 9.

3. A water-in-oil (W/O) emulsion ink for stencil printing according to claim 1, wherein said water phase contains an oil-in-water (O/W) emulsion of resin.

4. A water-in-oil (W/O) emulsion ink for stencil printing according to claim 1, wherein the water phase contains a water soluble resin.

5. A water-in-oil (W/O) emulsion ink for stencil printing according to claim 1, wherein the water-in-oil (W/O) emulsion ink for stencil printing contains 1 to 30% by weight, based on a total weight of ink, of said carbon black.

6. A water-in-oil (W/O) emulsion ink for stencil printing according to claim 1, wherein the water-in-oil (W/O) emulsion ink for stencil printing contains 3 to 10% by weight, based on the total weight of ink, of said carbon black.

7. A water-in-oil (W/O) emulsion ink for stencil printing according to claim 5, wherein said carbon black has an average particle size of 10 μm or less.

8. A water-in-oil (W/O) emulsion ink for stencil printing, which contains carbon black as a water insoluble colorant in the water phase, and an oil phase wherein the oil phase is free of any resinous component, and said carbon black has a pH value of 6 to 10.

9. A water-in-oil (W/O) emulsion ink for stencil printing according to claim 8, wherein said carbon black has a pH value of 7 to 9.

10. A water-in-oil (W/O) emulsion ink for stencil printing according to claim 8, wherein said water phase contains an oil-in-water (O/W) emulsion of resin.

11. A water-in-oil (W/O) emulsion ink for stencil printing according to claim 8, wherein the water phase contains a water soluble resin.

12. A water-in-oil (W/O) emulsion ink for stencil printing according to claim 8, wherein the water-in-oil (W/O) emulsion ink for stencil printing contains 1 to 30% by weight, based on a total weight of ink, of said carbon black.

13. A water-in-oil (W/O) emulsion ink for stencil printing according to claim 8, wherein the water-in-oil (W/O) emulsion ink for stencil printing contains 3 to 10% by weight, based on the total weight of ink, of said carbon black.

14. A water-in-oil (W/O) emulsion in for stencil printing according to claim 8, wherein said carbon black has an average particle size of 10 μm or less.

* * * * *